United States Patent [19]

Omote et al.

[11] Patent Number: 4,643,845
[45] Date of Patent: Feb. 17, 1987

[54] METHOD OF CUTTING HIGH-ACTIVITY SOLID WASTE

[75] Inventors: Tatsuyuki Omote; Tomiharu Yoshida; Isamu Shimizu; Kichinori Metoki, all of Hitachi, Japan

[73] Assignee: Hitachi, Ltd., Tokyo, Japan

[21] Appl. No.: 597,738

[22] Filed: Apr. 6, 1984

[30] Foreign Application Priority Data

Apr. 8, 1983 [JP] Japan ................................ 58-60814

[51] Int. Cl.⁴ .......................... G21C 19/00; G21F 9/28
[52] U.S. Cl. ............................................. 252/626; 83/54; 83/425; 83/430; 83/440; 266/54; 376/261; 376/272
[58] Field of Search ................................ 376/260–261, 376/272; 29/723, 428; 252/626, 627; 266/48; 83/54, 37, 56, 425.1, 425, 430, 923; 266/54, 55, 56, 77

[56] References Cited

U.S. PATENT DOCUMENTS

| | | | |
|---|---|---|---|
| 2,990,169 | 6/1961 | Wheeler | 266/54 |
| 3,797,813 | 3/1974 | Roesel | 266/54 |
| 4,277,361 | 7/1981 | Szulinski | 252/627 |
| 4,290,906 | 9/1981 | Saito et al. | 252/626 |
| 4,434,092 | 2/1984 | Mary | 252/627 |
| 4,480,821 | 11/1984 | Noll et al. | 266/54 |
| 4,511,499 | 4/1985 | Meuschke et al. | 252/626 |

FOREIGN PATENT DOCUMENTS 53-27795 of 1978 Japan.
55-55299 of 1980 Japan.
55-26436 of 1980 Japan.
55-26407 of 1980 Japan.

*Primary Examiner*—Stephen J. Lechert, Jr.
*Assistant Examiner*—Howard J. Locker
*Attorney, Agent, or Firm*—Beall Law Offices

[57] ABSTRACT

A method of and an apparatus for cutting a high-activity solid waste, such as a used channel box and a used control rod, to reduce same in size to facilitate its disposal. The channel box is cut axially through opposing corners to produce elongated split portions of an L-shaped in cross section, and the control rod is cut axially through a central portion to produce elongated split portions of an L-shape in cross section. The portions obtained by cutting the channel box and control rod are substantially similar in shape and facilitate storing.

8 Claims, 31 Drawing Figures

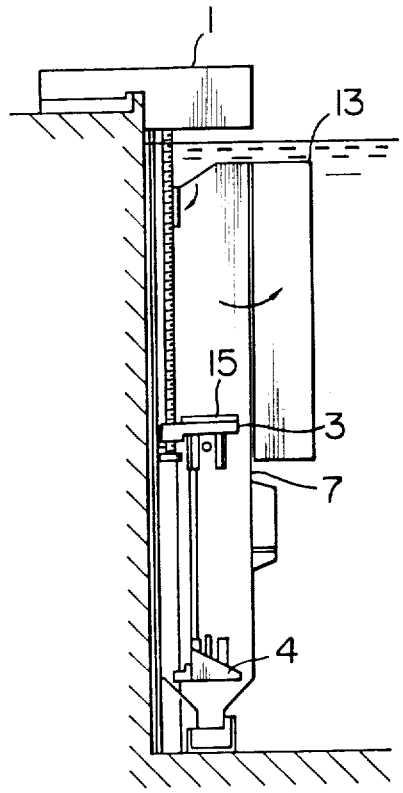
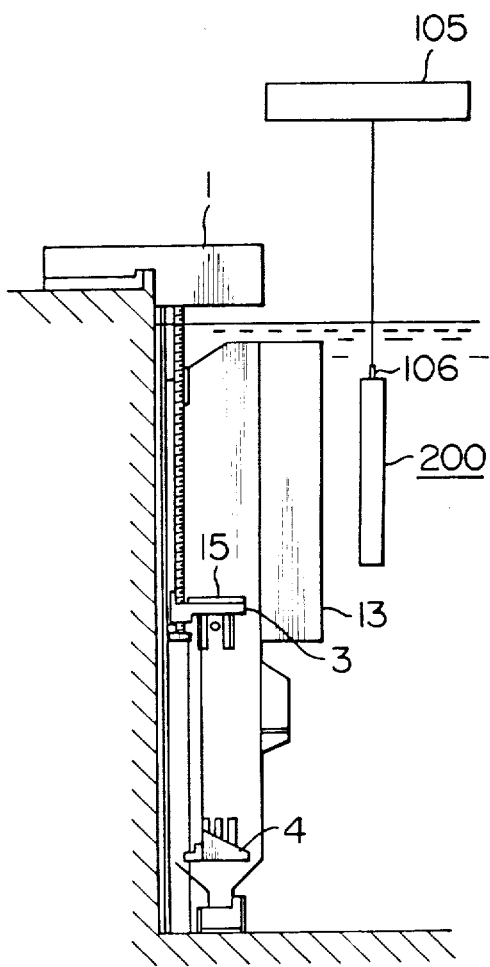

FIG. 20
FIG. 21
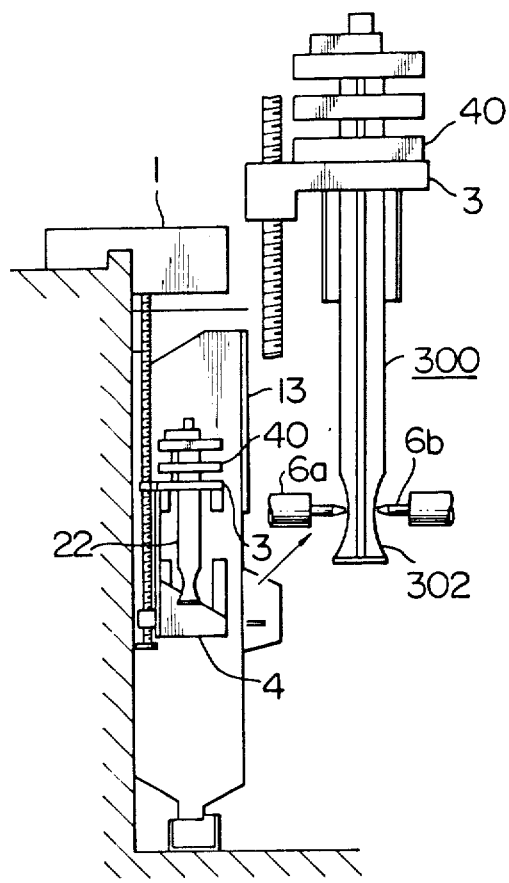
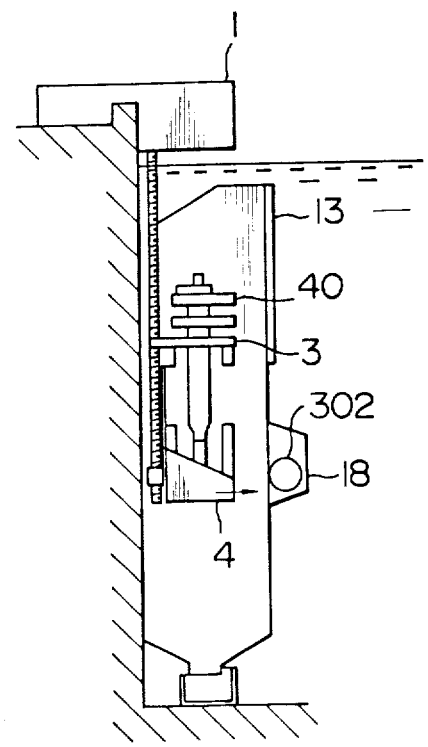

FIG. 23
FIG. 24
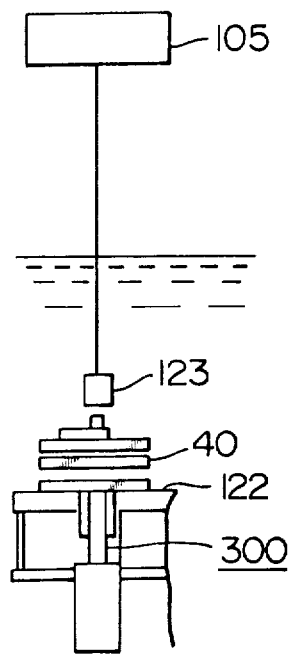
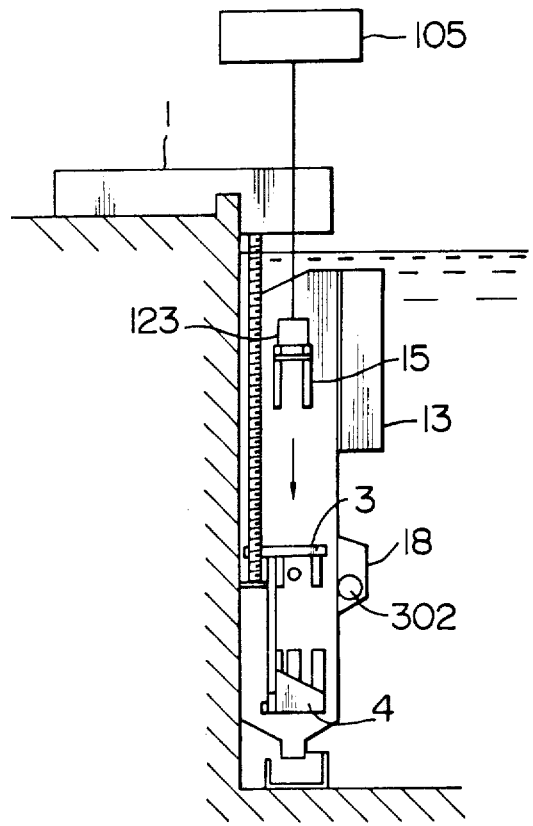

FIG. 25
FIG. 26
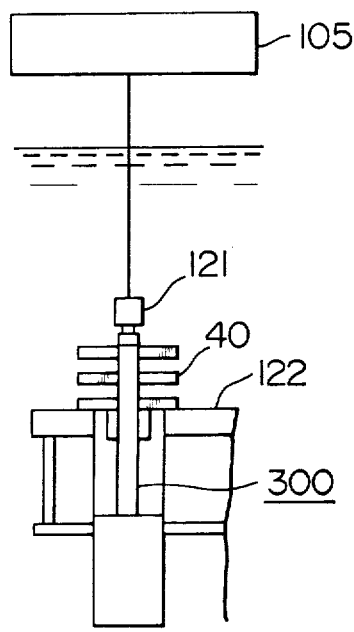
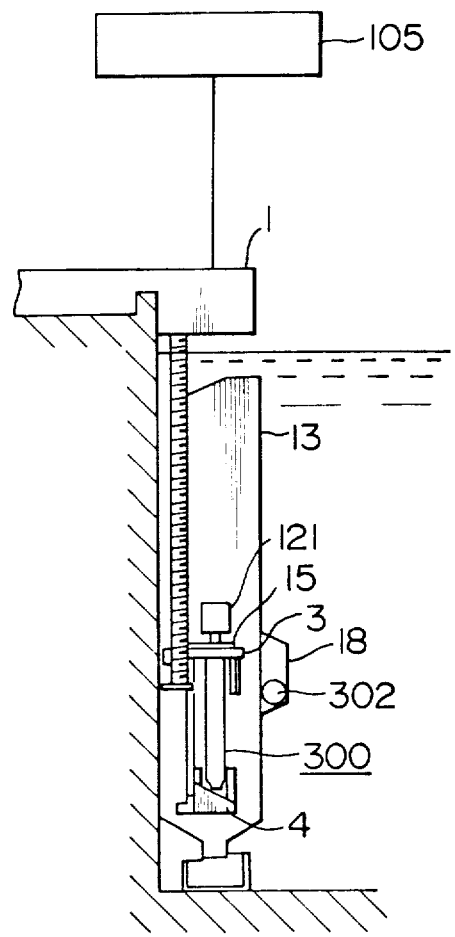

FIG. 30
FIG. 31
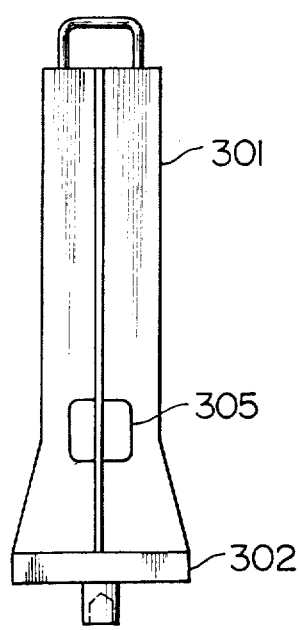
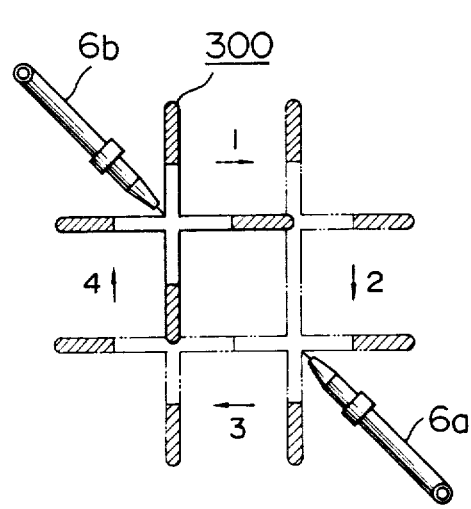

4,643,845

METHOD OF CUTTING HIGH-ACTIVITY SOLID WASTE

BACKGROUND OF THE INVENTION

This invention relates to a method of and an apparatus for cutting a high-activity solid waste, and more particularly it is concerned with a method and an apparatus suitable for use in cutting, reducing and disposing a high-activity solid waste produced in a nuclear reactor, such as a used channel box (hereinafter FCB) or a used control rod (hereinafter CR).

Heretofore, high-activity solid wastes, such as FCBs or CRs, produced in a nuclear reactor have been stored in an elongated form in a spent fuel storage pool or a high-activity solid waste storage pool in a nuclear power plant. An FCB is an elongated box of rectangular cross-sectional form and a CR is crisscross in shape. Thus, when they are stored, they raise the problem that they have a very low storage density and a very large space is required for storing them. To obviate this problem, it has become necessary to cut the FCB and CR into shapes suitable for storing, such as planar plate shape, thereby improving storing efficiency. To meet this requirement, FCB cutting apparatus have already been developed. These apparatus rely on punching or shearing effected with rotary cutters and have suffered the disadvantages that it takes time to cut an FCB and it is impossible to cut a CR. As for cutting a CR, no suitable cutting method has yet been developed.

SUMMARY OF THE INVENTION

A first object of this invention is to provide a method of cutting an FCB and a CR which enables them to be cut into substantially the same shape that best suits storing while minimizing time and labor necessary to effect cutting.

A second object is to provide an apparatus constituted by a unitary structure which is suitable for carrying the PCB and CR cutting method into practice to cut them at a substantially high speed.

To accomplish the aforesaid objects, the invention provides two features. One of them is that the cutting method comprises the step of axially cutting an FCB of a rectangular cross-sectional shape through opposing corners thereof to produce elongated split portions of an L-shape in cross section, and the step of axially cutting a CR of a criss-cross cross-sectional shape through a central portion thereof to produce elongated split portions of an L-shape in cross section. The other feature is that the cutting apparatus comprises cutting means for cutting an FCB and a CR comprising cutting torches secured in a fixed position, and an object-of-cutting support means for moving the objects of cutting vertically in elevatory movement and horizontally for shifting movement.

Additional and other objects, features and advantages of the invention will become apparent from the description set forth hereinafter when considered in conjunction with the accompanying drawings.

BRIEF DESCRIPTION OF THE DRAWINGS

FIGS. 9-16 are views showing step by step the process steps for cutting an FCB by the cutting apparatus shown in FIGS. 3-5;

FIGS. 17-28 are views showing step by step the process steps for cutting a CR by the cutting apparatus shown in FIGS. 3-5;

FIG. 30 is a view showing in detail the construction of a CR; and

FIG. 31 is a view showing in detail the manner of cutting the velocity limiter of a CR.

DESCRIPTION OF THE PREFERRED EMBODIMENTS

Figure 1:
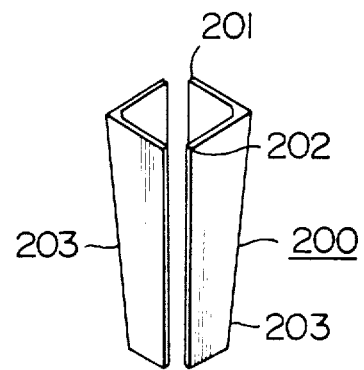
FIG. 1 is a view of an FCB cut by the cutting method according to the invention.

The invention will now be described in detail by referring to the embodiments shown in the drawings.

Figure 2:
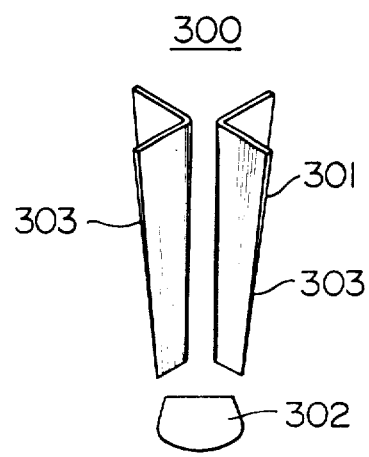
FIG. 2 is a view of a CR cut by the method according to the invention.

FIGS. 1 and 2 show an FCB and a CR respectively cut by the method according to the invention. As described hereinabove, the FCB 200 is an elongated body of a rectangular cross-sectional shape. By cutting the PCB 200 axially through opposing corners 201 and 202, it is possible to obtain two elongated split portions 203 of an L-shape in cross section.

As is well known, the CR 300 comprises a blade 301 of a crisscross cross-sectional shape, and a velocity limiter 302. By axially cutting the blade 301 through a central portion after severing the velocity limiter 302 from the blade 301, it is possible to obtain two elongated split portions 303 of the CR 300 of an L-shape in cross section.

The two L-shaped elongated split portions 203 and 303 are substantially similar in dimensions and shape. Thus, by stacking them in the same direction or alternately superposing one over another if necessary when they are stored, it is possible to greatly improve storing efficiency.

Figure 3:
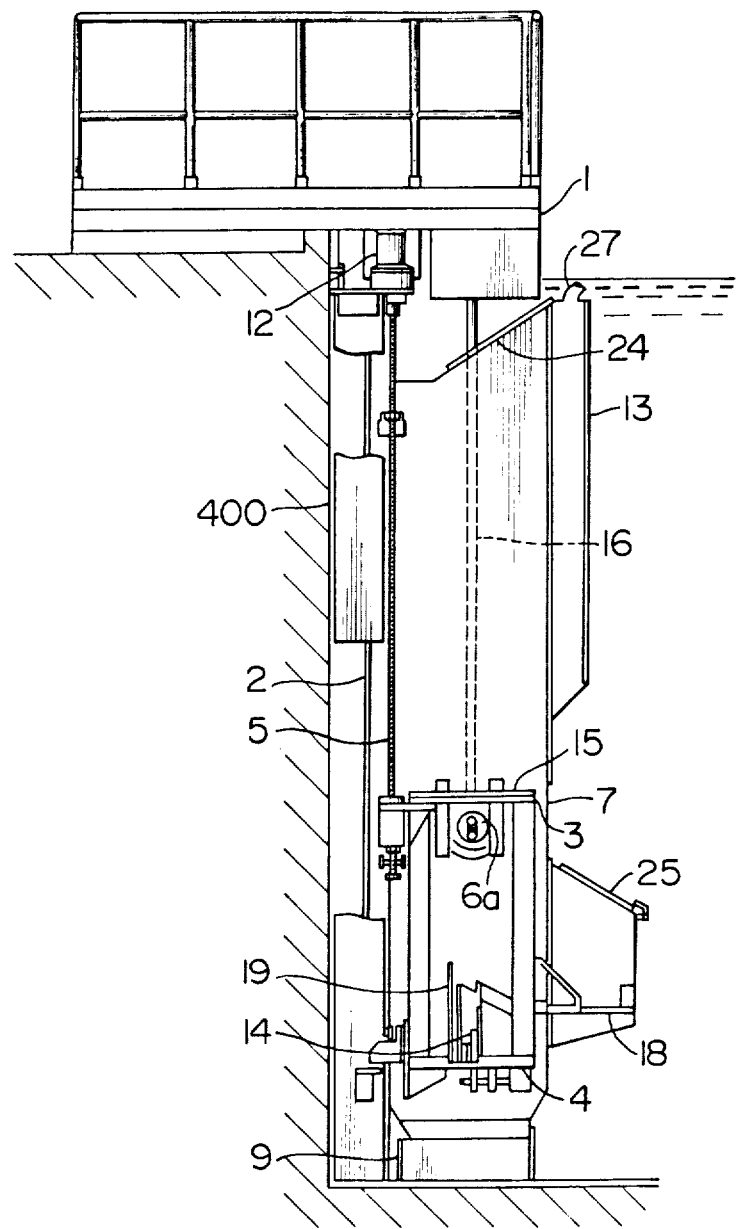
FIG. 3 is a side view of the cutting apparatus comprising one embodiment of the invention.
Figure 4:
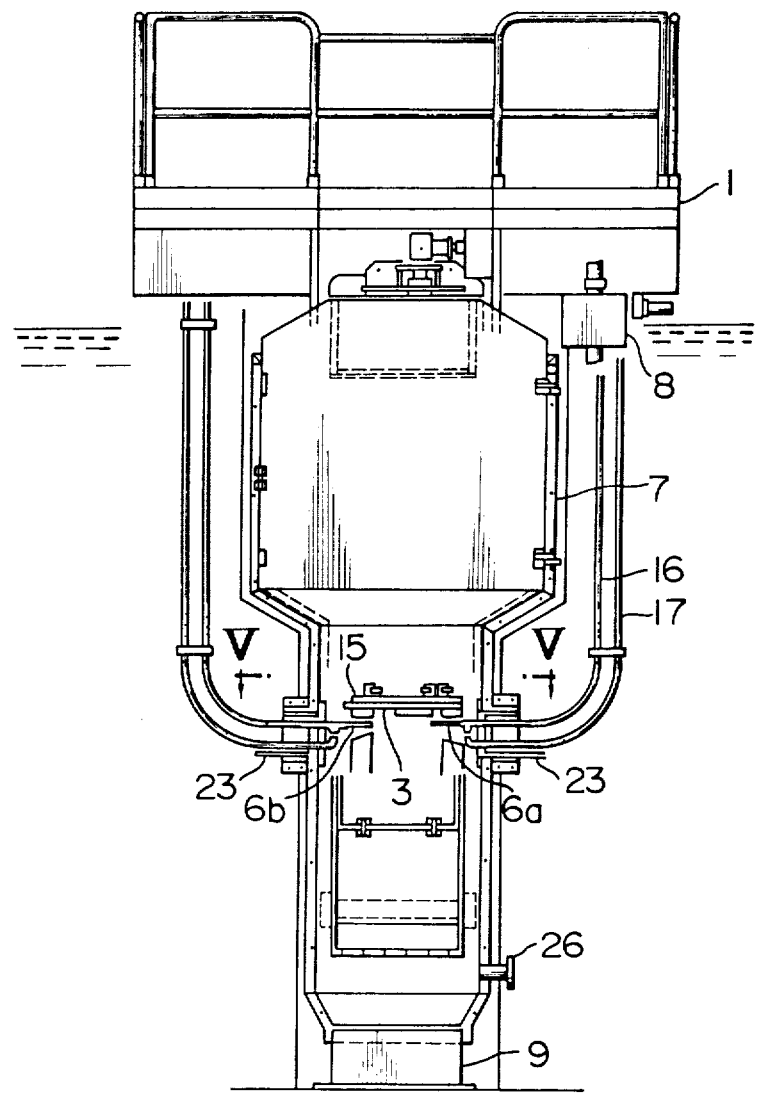
FIG. 4 is a front view of the cutting apparatus shown in FIG. 3.
Figure 5:
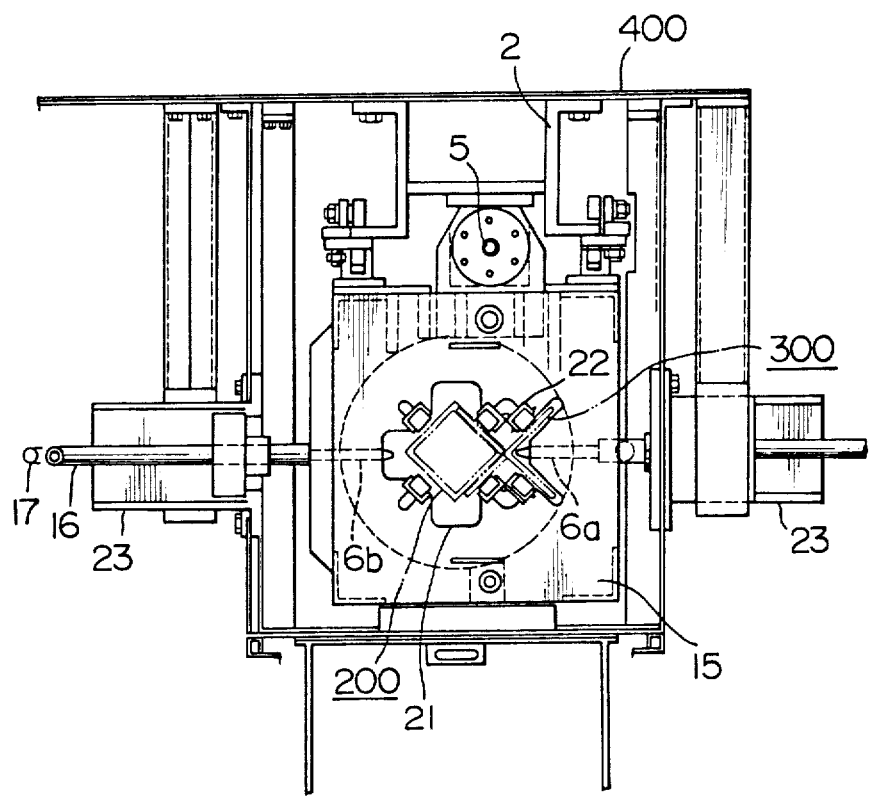
FIG. 5 is a sectional view taken along the line V—V in FIG. 4.
Figure 6:
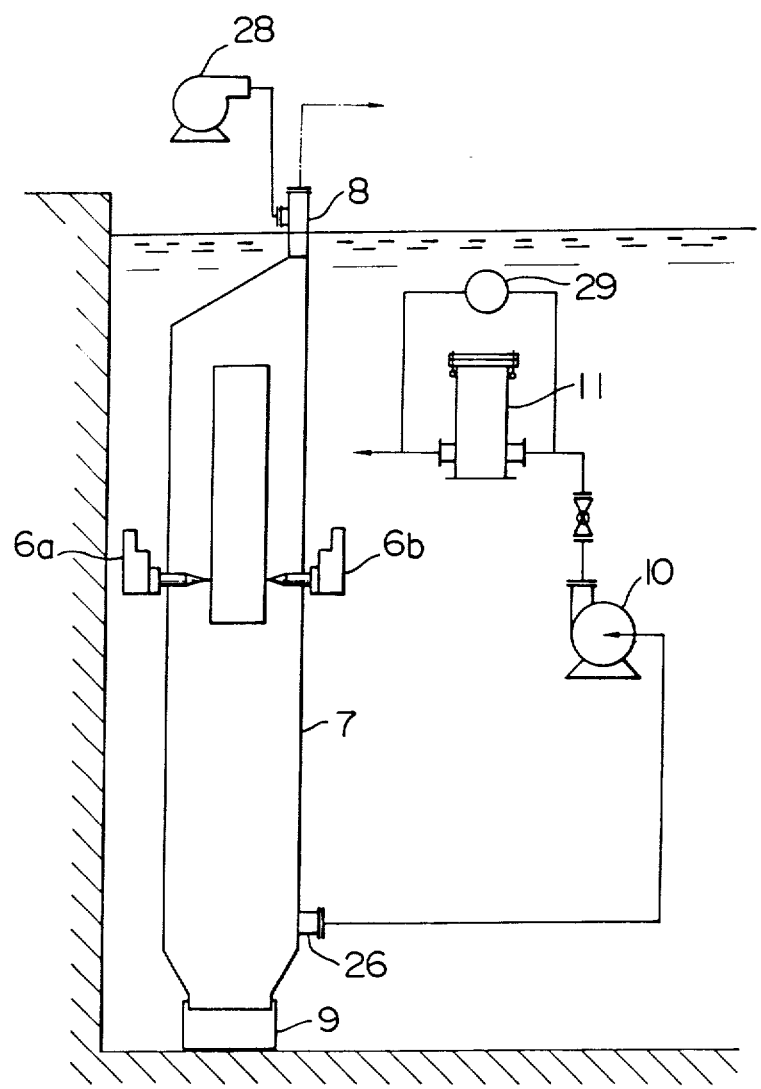
FIG. 6 is a systematic view of a system for recovering gases, drosses and floating objects produced by the operation of the cutting apparatus shown in FIGS. 3-5.

FIGS. 3-5 shows the construction of the cutting apparatus according to the invention, and FIG. 6 shows in a systematic view of the cutting apparatus in its entirety.

Referring to FIG. 3, the cutting apparatus is located on a floor of a storage pool 400 and comprises a base 1 extending over the liquid level of the pool 400, and a frame 2 extending downwardly from the base 1 along a wall surface of the pool 400 to be submerged in the water in the pool 400. The frame 2 has an upper cart 3 and a lower cart 4 which move vertically in elevatory movement while being guided by the frame 2. The upper and lower carts 3 and 4 are connected together and supported by a ball screw mechanism 5 connected to a drive motor 12 located on a undersurface of the base 1 for movement as a unit in elevatory movement as the drive motor 12 is actuated.

The upper cart 3 has placed thereon a detachable support table 15 suitable for supporting both an FCB and a CR which, as shown in FIG. 5, is formed with an opening 21 for inserting the FCB 200 (CR 300) and has guide rollers 22 which hold, from the side of the lower cart 4, the FCB 200 (CR 300) suspended from an upper portion of the support table 15, to support it in a predetermined position.

The lower cart 4 has mounted thereon clamp means 14 operated by an air cylinder for clamping an object to be cut or workpiece by gripping the FCB 200 or CR 300 at its lower end and securing same in position. The clamp means 14 also functions as a contact of a power source to supply power to the workpiece. A portion of the lower cart 4 at which the clamp means 14 is mounted is located at a higher elevation than the rest of the lower cart 4, so that it is possible to ascertain that cutting has been finished because the workpiece slightly moves downwardly when it is cut off. A member 19 is provided for guiding the velocity limiter 302 of the CR 300 toward a velocity limiter housing 18 after it is cut off.

For cutting the FCB 200 and CR 300, the water jet cutting technique of the electrode melting type disclosed in Japanese Patent Laid-Open No. 78549/75 is suitable. Torches used in this technique are located as shown in FIG. 5, and two torches 6a and 6b are used when the FCB 200 is cut but only one torch 6a is used when the CR is cut. The torches 6a and 6b which are connected to wire supply means and water supply means on the base 1 through a wire supply line 16 and a water supply line 17 respectively are supported on a cutting torch support table 23 attached to a partition wall 7 for partitioning the pool 400. The cutting torch support table 23 is constructed such that it can be moved to outside in sliding movement to detach the cutting torches 6a and 6b when maintenance and repair are carried out.

In order to avoid the dispersion in the pool 400 of drosses, gases and floating solid objects when a cutting operation is performed, the partition 7 serves the useful purpose. Referring to FIG. 3 again, the partition wall 7 has attached to its upper portion a door 13 and a lid 24 that can be moved only in one direction for opening and closing a space defined between the frame 2 and the partition wall 7 to allow the FCB 200 and CR 300 to be moved into or out of the space. The partition wall 7 has the velocity limiter housing 18 attached thereto which is provided with a lid 25 moved to an open position when it is desired to withdraw the velocity limiter 302 from the housing 18. Connected to an upper portion of the partition wall 7 is a gas recovery tube 27 which is connected to a gas recovery box 8 where the gases are mixed with air by means of a blower 28 and diluted before being discharged through an exhaust system. Means for collecting and diluting the gases, such as gas recovery tube 27 and blower 28, are mounted on the partition wall 7. A dross box 9 is located in a lower portion of the partition wall 7 for receiving drosses which freely move downwardly by gravity as they are produced by a cutting operation. A floating object recovery port 26 (see FIG. 4) is formed in the lower portion of the partition wall 7, and floating objects drawn together as a floating object recovery pump 10 is actuated is collected by a filter 11. The filter 11 is provided with a differential manometer 29 enabling the service life of the filter 11 to be checked at all times. Means for clearing the pool 400 of the floating objects, such as pump 10 and filter 11, are also mounted on the partition wall 7.

Figure 7:
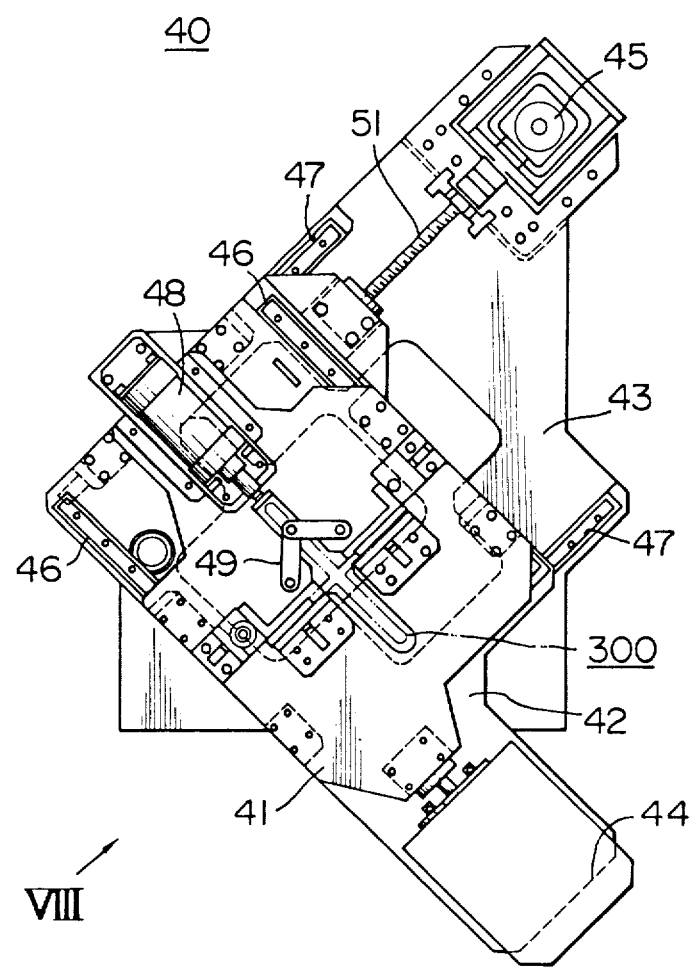
FIG. 7 is a plan view of the X-Y table for the CR.
Figure 8:
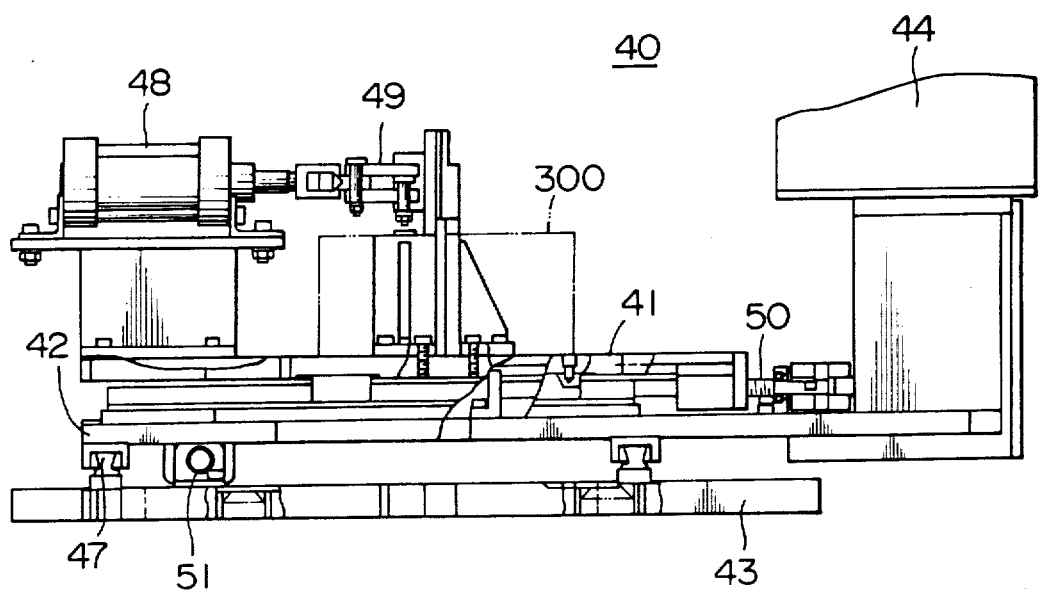
FIG. 8 is a view as seen in the direction of an arrow VIII in FIG. 6.

An X-Y table 40 for the CR for cutting off the velocity limiter 302 of the CR 300 will be described by referring to FIGS. 7 and 8. The X-Y table 40 is constructed such that it can be detachably attached to the upper cart 3 after the support table 15 for supporting the FCB or CR is detached therefrom, and is composed of tables 41, 42 and 43 arranged in three stages. The first stage table 41 is movable along guide rails 46 on the second stage table 42 as it is driven by a drive motor 44 through a ball screw 50 for reciprocatory movement. The second stage table 42 is movable along guide rails 47 on the third stage table 43 as it is driven by a drive motor 45 through a ball screw 51 for reciprocatory movement. The guide rails 46 intersect the guide rails 47 at right angles.

The first stage table 41 supports thereon clamp means 49 driven by an air cylinder 48.

The process steps for cutting the FCB and CR by using the cutting apparatus of the aforesaid construction according to the invention will be described by referring to FIGS. 9–28.

The process steps for cutting the FCB will first be described.

Figure 9:
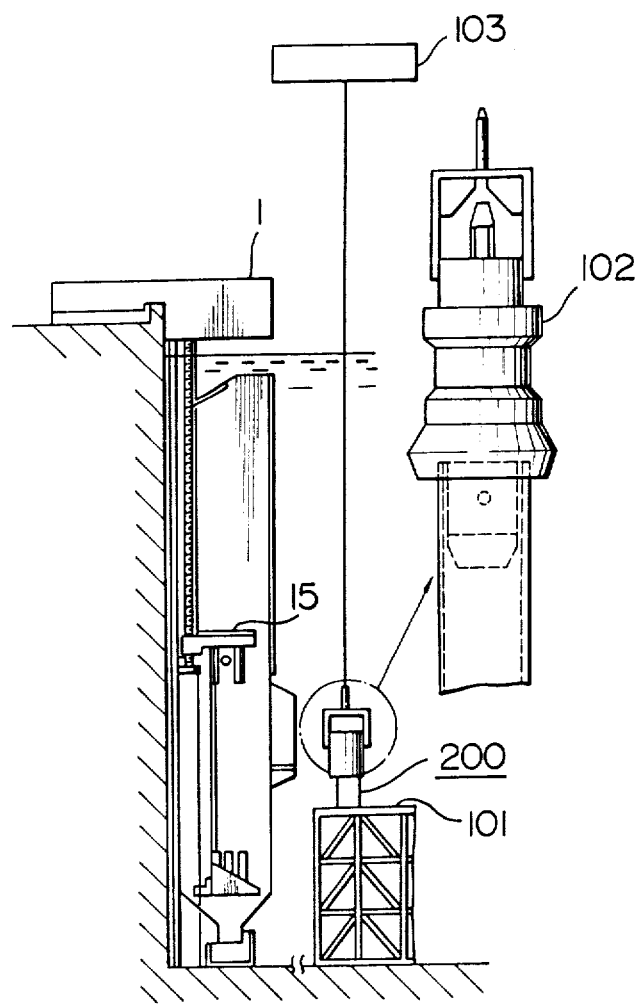
Figure 10:
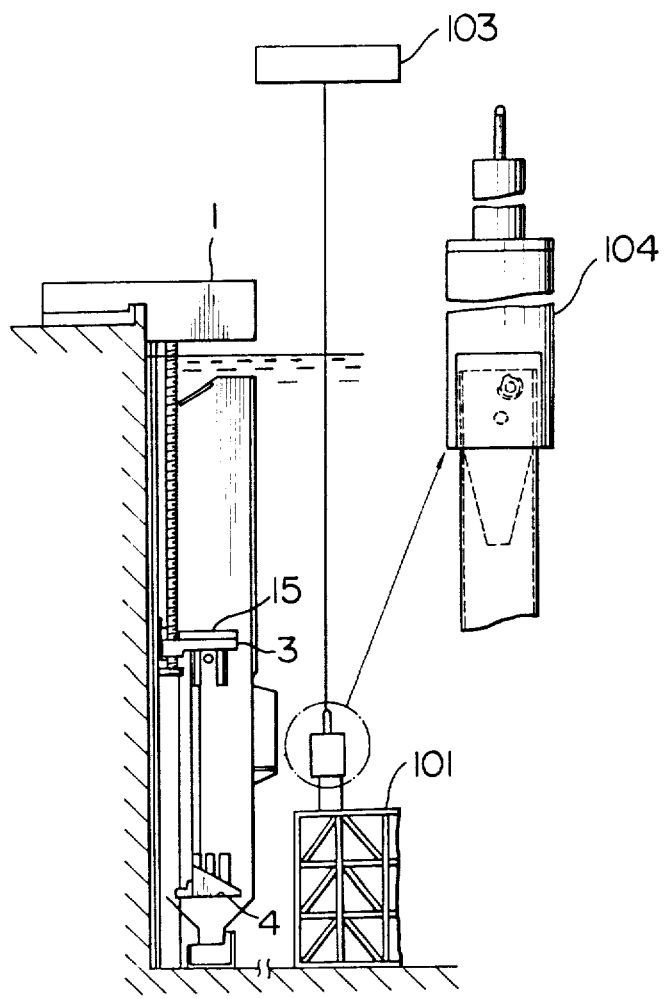

Referring to FIGS. 9 and 10, a storage rack 101 for holding the FCB 200 is moved to the site of operation. Then, clips and spacers of the FCB 200 are removed by clip removing means 102 and spacer removing means 104 suspended from a jib crane 103 while the FCB 200 is in the FCB storage rack 101. Detailed description of these operations will be omitted because they are no different from those performed in the prior art. Meanwhile, the support table 15 for use with both the FCB and CR is attached to an upper portion of the upper cart 3 of the cutting apparatus.

Figure 13:
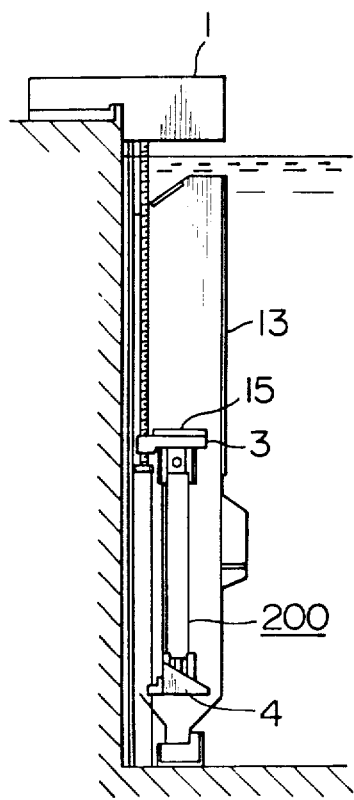
Figure 14:
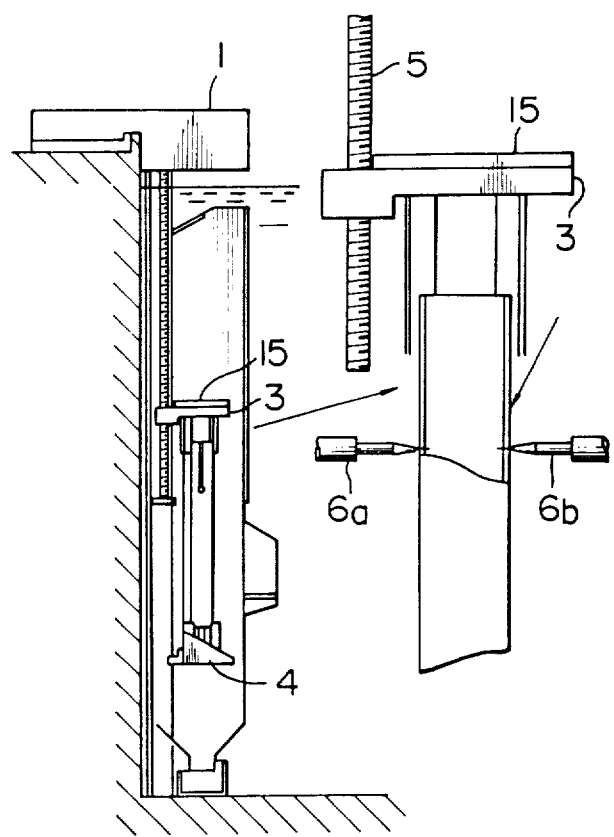
Figure 15:
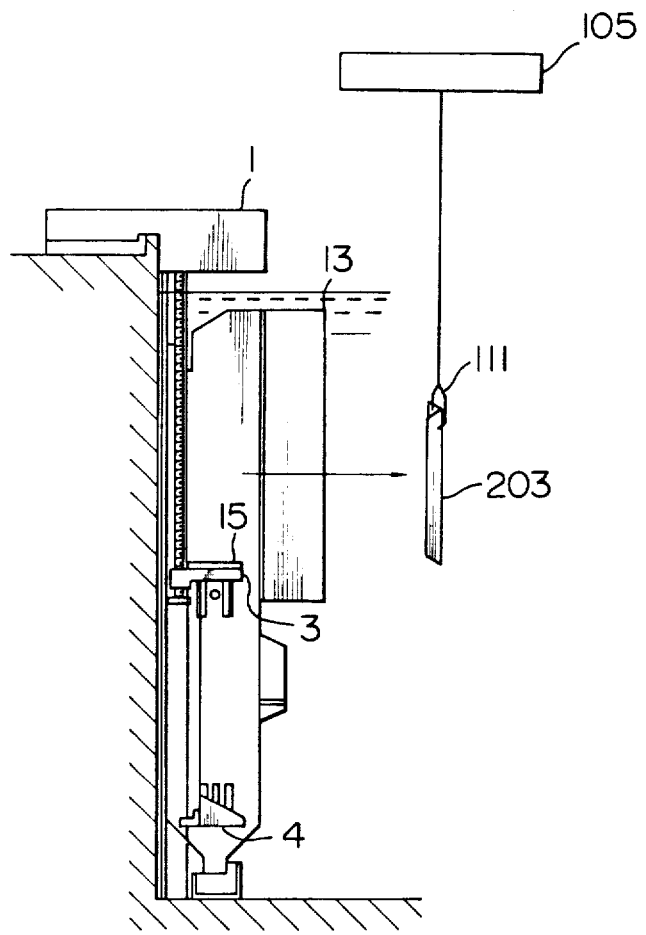
Figure 16:
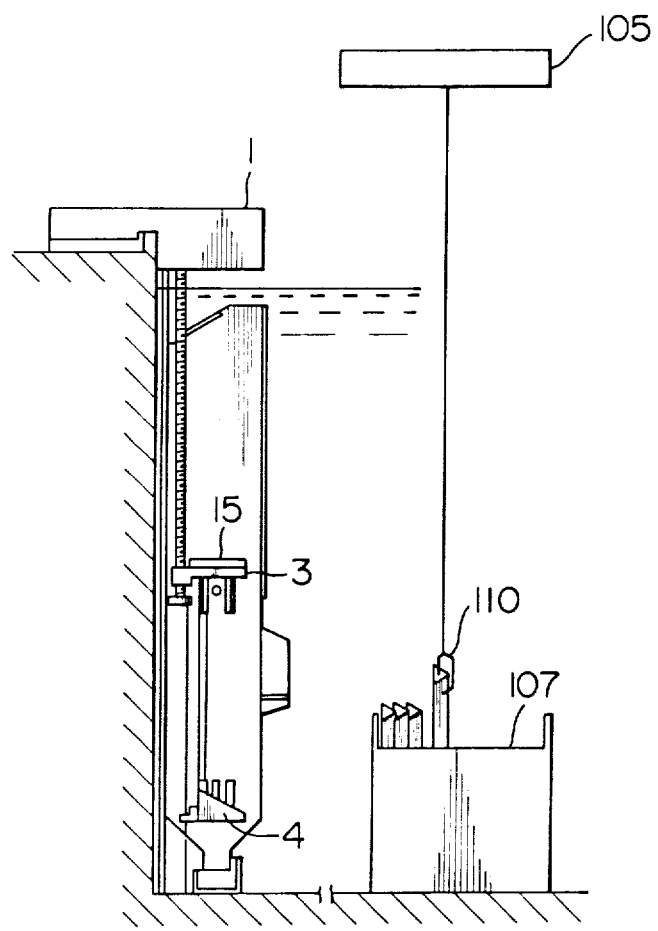

As shown in FIG. 11, the door 13 of the partition wall 7 of the cutting apparatus is brought to an open position, and the FCB 200 is moved downwardly from the upper portion of the upper cart 3 by an FCB handling tool 106 operated from an operation platform 105 as shown in FIG. 12. Thereafter, the door 13 is closed as shown in FIG. 13 and the upper and lower carts 3 and 4 are moved up and down as shown in FIG. 14 to perform cutting. Upon finishing cutting, the elongated split portion 203 of the FCB 200 is taken out by an elongated split portion handling tool 111 as shown in FIG. 15 and placed in an elongated split portion housing 127 as shown in FIG. 16.

The process steps for cutting the CR will be described.

Figure 17:
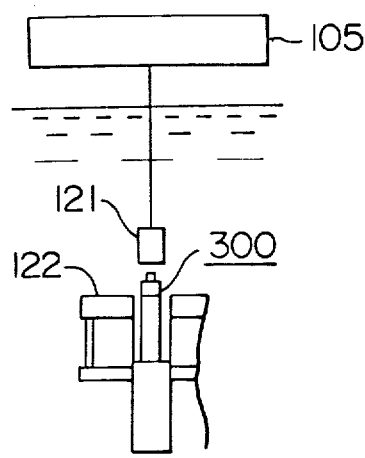
Figure 18:
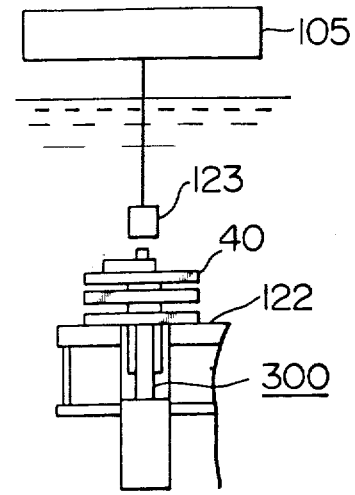
Figure 19:
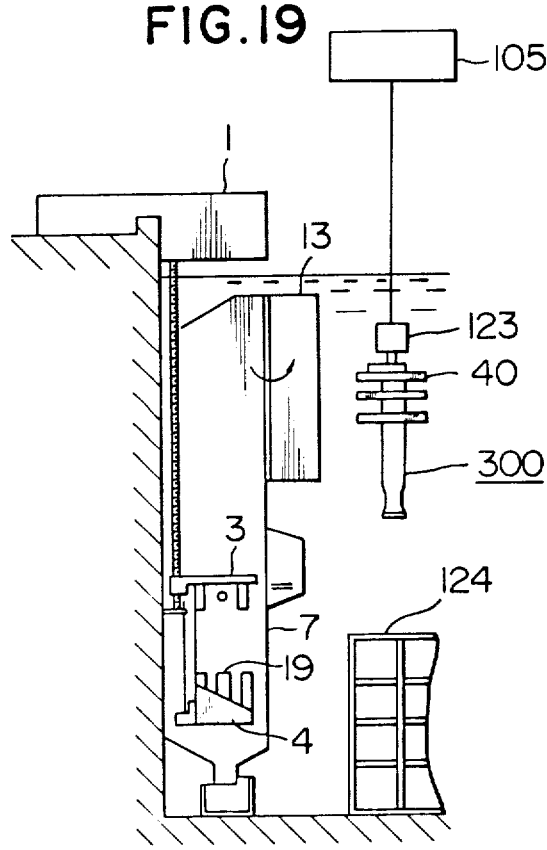

Referring to FIG. 17, the CR 300 is moved by a CR handling tool 121 to a temporary mount 122 to which the X-Y table 40 for the CR 300 is attached by means of a table hanger 123 as shown in FIG. 18, and the CR 300 is clamped in place by the clamp means 49 (FIGS. 7 and 8) of the X-Y table 40. At this time, the support table 15 for the FCB and CR has been moved from the upper cart 3 of the cutting apparatus. Then, as shown in FIG. 19, the X-Y table 40 for the CR is lifted together with the CR 300 by the table hanger 123 from a CR storage rack 124 and moved into the space defined by the partition wall 7 after the door 13 is opened, to be mounted on the upper cart 3 of the cutting apparatus. At this time, the CR 300 is supported such that its lower end clears the lower cart 4. Thereafter, the upper and lower carts 3 and 4 are moved upwardly until a portion of the CR 300 at which the velocity limiter 302 is severed from the blade 301 is disposed at the same elevation as the cutting torches 6a and 6b. The drive motors 44 and 45 of the X-Y table 40 are suitably actuated to move the CR 300 horizontally to cut off the velocity limiter 302. The velocity limiter 302 severed from the blade 301 in this way is moved, as shown in FIG. 21, by the guiding and moving member 19 (FIG. 3) on the lower cart 4 into the velocity limiter housing 18.

Figure 22:
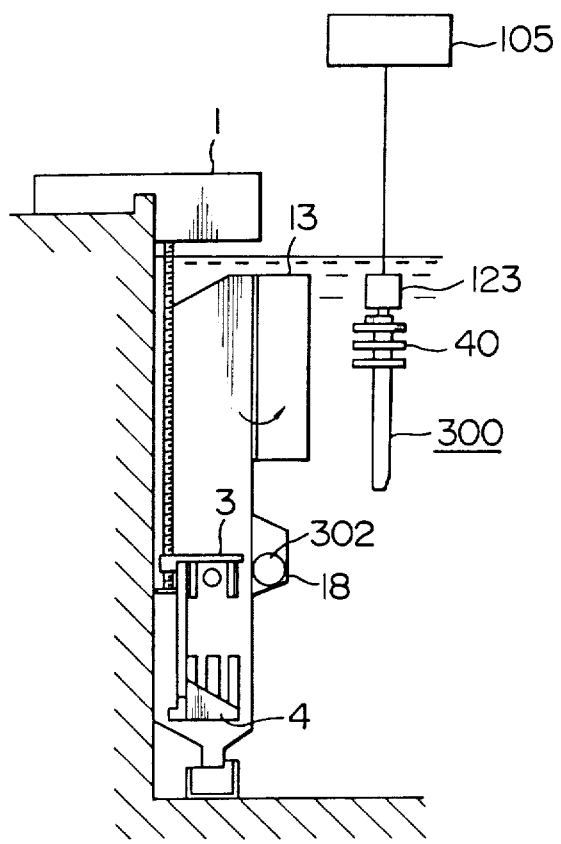

Referring to FIG. 22, the blade 301 of the CR 300 from which the velocity limiter section 302 is severed is detached together with the X-Y table 40 for the CR from the cutting apparatus, and moved to the temporary mount 122 for the CR as shown in FIG. 23. Then, the support table 15 for the FCB and CR is mounted on the upper cart 3 of the cutting apparatus by an operation shown in FIG. 24. Thereafter, the CR 300 on the temporary mount 122 for the CR is withdrawn from the X-Y table 40 for the CR as shown in FIG. 25 and inserted through an upper portion of the cutting apparatus and clamped in position by the clamp means 14 (FIG. 3) on the lower cart 3 (FIG. 26).

Figure 27:
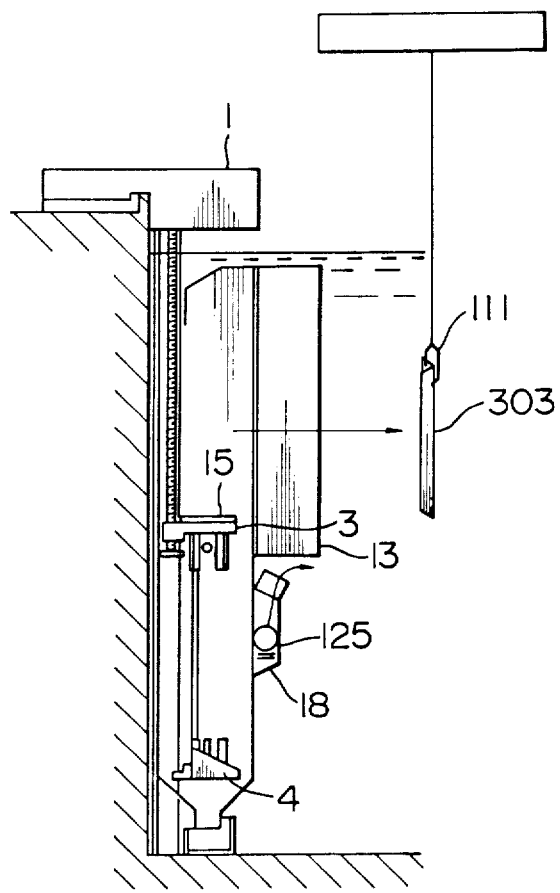
Figure 28:
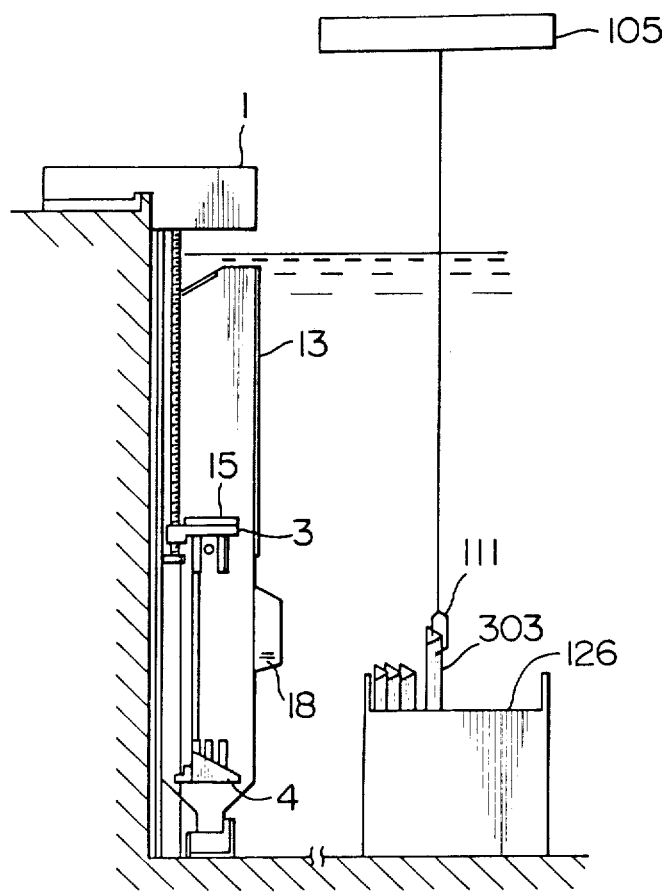

The upper and lower carts 3 and 4 are moved up and down to cut the CR 300 axially through the center of a tie rod by means of the cutting torch 6a. After the cutting operation is finished, the elongated split portion 303 of the CR is withdrawn by the elongated split portion handling tool 111 as shown in FIG. 27, and an inserted in an elongated split portion housing 126 as shown in FIG. 28.

The process steps for the cutting operations described hereinabove are shown tables as follows:

TABLE 1

| | | Process Steps for Cutting FCB | |
|---|---|---|---|
| No. | Item | Equipment in Use | Operation Site |
| 1 | FCB moved | Operation platform 105<br>FCB handling tool 106 | From storage position to operation position (FCB storage rack 101) |
| 2 | Clip removing means 102 mounted | — | FCB storage rack 101 |
| 3 | Clips removed | Exclusive jib crane 103<br>Clip removing means 102 (FIG. 9) | |
| 4 | Clips discarded | Same as above and discarded containers | |
| 5 | Clip removing means dismounted | — | |
| 6 | Spacer removing means 104 mounted | — | FCB storage rack 101 |
| 7 | Spacers removed | Exclusive jib crane 103<br>Spacer removing means 104 (FIG. 10) | |
| 8 | Spacers discarded | Same as above and dicarded vessels | |
| 9 | Spacer removing means 104 dismounted | — | |
| 10 | Partition wall door 13 of cutting apparatus opened | | Cutting apparatus from FCB storage rack 101 to cutting apparatus |
| 11 | FCB moved | Operation platform 105<br>FCB handling tool 106 (FIG. 12) | |
| 12 | Partition wall door 13 opened | Cutting apparatus | Cutting apparatus |
| 13 | FCB cutting commenced<br>Circulation pump 10 actuated<br>Blower 28 actuated<br>Water supply pump actuated<br>Wire supplied<br>Upper and Lower carts driven | Cutting apparatus | Cutting apparatus |
| 14 | FCB cutting terminated (equipment deactuated) | (FIG. 14) | |
| 15 | Partition wall door 13 opened | — | Cutting apparatus |
| 16 | FCB detached, moved and stored | Operation platform 105<br>Elongated split portion handling tool 111 (FIG. 15) | From cutting apparatus to elongated split portion housing 107 |
| 17 | Partition wall door 13 closed | — (FIG. 16) | Cutting apparatus |

(Note)
In the operation tabulated hereinabove, the process steps 2-9 and 10-17 can be followed simultaneously.

TABLE 2

| | | Process Steps for Cutting CR | |
|---|---|---|---|
| No. | Item | Equipment in Use | Operation Site |
| 1 | CR300 moved | Operation platform 105<br>CR handling tool 121 (FIG. 17)<br>CR temporary mount 122 | From storage position to CR temporary mount 122 |
| 2 | CR regripped | Operation platform 105 | CR temporary mount |

TABLE 2-continued

Process Steps for Cutting CR

| No. | Item | Equipment in Use | Operation Site |
|---|---|---|---|
| | CR handling tool 121 switched to table hanger 123 | X-Y table 40 for CR Table hanger 123 (FIG. 18) | 122 |
| 3 | Partition wall door 13 of apparatus opened | — | Cutting apparatus |
| 4 | CR 300 mounted | Operation platform 105 X-Y table 40 for CR Table hanger 123 Cutting apparatus (FIG. 19) | From CR temporary mount 122 to cutting apparatus |
| 5 | Partition wall door 13 closed | — | Cutting apparatus |
| 6 | Cutting of CR velocity limiter 302 commenced Circulation pump 10 actuated Blower 28 actuated Water supply pump actuated Wire supplied X-Y table 40 driven | Cutting apparatus | Cutting apparatus |
| 7 | Cutting of CR velocity limiter 302 terminated (All equipment rendered inoperative) | (FIGS. 20 and 21) | |
| 8 | Partition wall door 13 opened | — (FIG. 22) | Cutting apparatus |
| 9 | CR temporarily removed and moved | Operation platform 105 X-Y table for CR 40 Table hanger 123 (FIG. 23) | From cutting apparatus to CR temporary mount 122 |
| 10 | FCB/CR support table 15 installed | Operation platform 105 FCB/CR support table 15 Table hanger 123 Cutting apparatus (FIG. 24) | From temporary mount 122 to cutting apparatus |
| 11 | CR regripped Table hanger 123 switched to CR handling tool 121 | Operating platform 105 CR handling tool 21 CR temporary mount 122 (FIG. 25) | Cutting apparatus |
| 12 | CR reinstalled | Operation platform 105 CR handling tool 21 Cutting apparatus (FIG. 26) | From CR temporary mount 122 to Cutting apparatus |
| 13 | Partition wall door 13 closed | — | Cutting apparatus |
| 14 | Cutting of CR Commenced Circulation pump 10 actuated Blower 28 actuated Water supply pump actuated Wire supplied Upper and lower carts 3 and 4 driven | Cutting apparatus | Cutting apparatus |
| 15 | Cutting of CR terminated (All equipment rendered inoperative) | | |
| 16 | Partition wall door 13 | — | Cutting apparatus |
| 17 | CR removed, moved and stored | Operation platform 105 Elongated split portion handling tool 111 (FIG. 27) | From cutting apparatus to elongated split portion housing 126 |
| 18 | Partition wall door 13 closed | — (FIG. 28) | Cutting apparatus |

In the embodiment shown and described hereinabove, the FCB and CR can be cut into elongated split portions of an L shape in cross section. Thus, by storing these elongated split portions in the housing rack as shown in FIG. 28, storing efficiency can be improved from about fourfold to sevenfold as compared with storing the FCB and CR in their original shapes. The cutting operation for cutting the FCB and CR can be performed in the water by remote control by means of the same cutting apparatus. Combined with a shortening of time required for performing the cutting operation made possible by a reduction in the length of the cutting line, this has improved operation efficiency while reducing the risk of exposure of the operator to radiation.

In the embodiment shown and described hereinabove, the cutting has been described has being performed by a jet cutting technique. This is because this cutting technique best serves the purpose and suits the condition. However, the invention is not limited to this specific cutting technique when the method according to the invention is carried into practice, and any other suitable cutting technique may be used without departing from the scope of the invention.

When the velocity limiter 302 of the CR is severed from the blade 301, the cutting torch 6a can be moved horizontally. When this is the case, the X-Y table 40 for the CR can be eliminated, by means should be provided for moving the cutting torch 6a and lines connected to the cutting torch 6a should be rendered flexible.

The cutting apparatus shown and described hereinabove may be simplified as a cutting apparatus exclusively for cutting the CR by doing without the function for cutting the FCB for which a solution has already been found.

Figure 29:
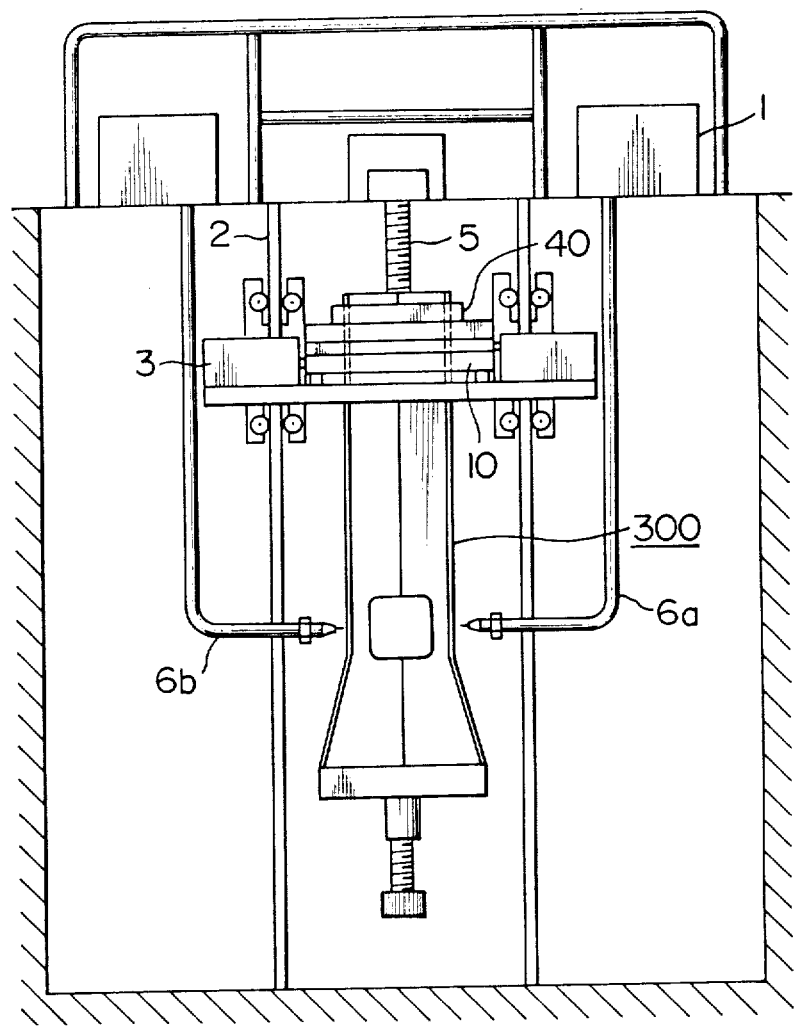
FIG. 29 is a front view of the cutting apparatus exclusively for cutting a CR, comprising another embodiment.

FIG. 29 shows another embodiment of the cutting apparatus in conformity with the invention which is essentially no different from the embodiment in a condition in which the X-Y table 40 for the CR is attached to the upper cart 3 of the cutting apparatus.

Referring to FIG. 30, the CR 300 is formed with a square opening at an upper portion of the velocity limiter 302 which is of a crisscross cross-sectional shape. When cutting is performed, the CR 300 is clamped on to the table 40 by clamp means and moved, as shown in FIG. 31 in an X-Y direction together with the table 40, to thereby cut each of portions of the blade 301 of the crisscross shape. At this time, the two cutting torches 6a and 6b cut two portions each of the blade 301 of the crisscross shape. After the velocity limiter 302 is cut off, the center of the blade 301 of the crisscross shape is moved toward the torch 6a and cutting is effected by feeding a cutting material to the torch 6a.

In this embodiment, the need to replace the support table 15 for both the FCB and CR by the X-Y table 40 exclusively for the CR is eliminated, thereby improving the operability of the CR cutting operation.

When the cutting method according to the invention is used, the FCB and CR can be cut into split portions of a substantially similar shape that suits storing by effecting cutting along a substantially short cutting line.

In the cutting apparatus according to the invention described hereinabove and shown in the drawings, the FCB and CR can be cut in the water by remote control into portions of a substantially similar shape or the CR can be cut at least into portions of an L-shape in cross section.

What is claimed is:

1. A method for cutting a high activity solid waste of used nuclear reactor fuel channel boxes and control rods, each having a generally uniform cross-sectional shape along its axial length formed by four angularly oriented plates, comprising:
   providing at least one cart mounted for movement in an axial direction;
   holding a used channel box or a used control rod on the cart with its axis aligned with the cart axial direction;
   axially driving the cart and used channel box or a used control rod;
   providing at least one cutting torch secured in a predetermined position adjacent the cart; and
   axially cutting, as the torch and cart move relative to each other, the channel box through opposed corners thereof or the used control rod through a central portion thereof and thereby producing two L-shaped portions; commonly orienting the thus formed L-shaped portions and nesting the two together in a space saving manner;
   storing the nested L-shaped portions; and
   performing said steps of holding and cutting in a closed atmosphere environment having radiation protection.

2. The method of claim 1, further including moving the used control rod with means supporting the used control rod on the cart, in a direction perpendicular to the longitudinal axis thereof.

3. The method of claim 1, further including locating the cart and cutting torch in a space defined by a partition wall during said steps.

4. The method of claim 2, further including locating the cart and cutting torch in a space defined by a partition wall during said steps.

5. The method of claim 3, further including collecting gases generated when cutting is performed and diluting the collected gases with air by means provided to the partition wall.

6. The method of claim 4, further including collecting gases generated when cutting is performed and diluting the collected gases with air by means provided to the partition wall.

7. The method of claim 1, further including the preliminary step of cutting off a velocity limiter from the used control rod before cutting said used control rod to product the L-shaped potions.

8. The method of claim 1, wherein said step of cutting is performed underwater.

* * * * *